(12) United States Patent
Aydin et al.

(10) Patent No.: US 10,006,416 B2
(45) Date of Patent: Jun. 26, 2018

(54) AIR FILTER

(71) Applicant: Mahle International GmbH, Stuttgart (DE)

(72) Inventors: Muecahit Aydin, Stuttgart (DE); Mathias Brilke, Weil der Stadt (DE); Samuel Kohler, Weil im Schoenbuch (DE); Sven Letterer, Stuttgart (DE)

(73) Assignee: Mahle International GmbH (DE)

( * ) Notice: Subject to any disclaimer, the term of this patent is extended or adjusted under 35 U.S.C. 154(b) by 82 days.

(21) Appl. No.: 15/021,269

(22) PCT Filed: Sep. 8, 2014

(86) PCT No.: PCT/EP2014/069095
§ 371 (c)(1),
(2) Date: Mar. 10, 2016

(87) PCT Pub. No.: WO2015/036367
PCT Pub. Date: Mar. 19, 2015

(65) Prior Publication Data
US 2016/0222926 A1     Aug. 4, 2016

(30) Foreign Application Priority Data

Sep. 11, 2013 (DE) ........................ 10 2013 218 217

(51) Int. Cl.
*B01D 46/46* (2006.01)
*F02M 35/024* (2006.01)
(Continued)

(52) U.S. Cl.
CPC ...... *F02M 35/0207* (2013.01); *F02M 35/024* (2013.01); *F02M 35/02433* (2013.01);
(Continued)

(58) Field of Classification Search
CPC ................ B01D 46/46; F02M 35/024; F02M 35/10386; F02M 35/02
(Continued)

(56) References Cited

U.S. PATENT DOCUMENTS 4,280,360 A   7/1981  Kobayashi et al.
4,448,064 A   5/1984  Asayama
(Continued)

FOREIGN PATENT DOCUMENTS

DE     19650806 A1    6/1998
DE     10230430 A1    1/2004
(Continued)

OTHER PUBLICATIONS

English abstract for JP-2012-202364.
(Continued)

*Primary Examiner* — Robert A Hopkins
*Assistant Examiner* — Minh-Chau Pham
(74) *Attorney, Agent, or Firm* — Fishman Stewart PLLC

(57) ABSTRACT

An exemplary air filter may include an air-permeable filter body for cleaning air, and a filter housing for holding the filter body. The air filter may also include a clean-air port fluidically connected to the filter body and mechanically connected to the filter housing for attaching the air filter to a clean-air channel. The air filter may further include a first air-flow grid arranged in the clean-air port to stabilize the filtered air.

19 Claims, 2 Drawing Sheets

(51) Int. Cl.
*F02M 35/02* (2006.01)
*F02M 35/10* (2006.01)
*G01F 15/12* (2006.01)

(52) U.S. Cl.
CPC ... *F02M 35/10262* (2013.01); *F02M 35/10386* (2013.01); *G01F 15/125* (2013.01); *Y02T 10/146* (2013.01)

(58) Field of Classification Search
USPC ....... 55/385.3, DIG. 34, 529; 95/23; 96/422; 123/198 E
See application file for complete search history.

(56) References Cited

U.S. PATENT DOCUMENTS

| | | | |
|---|---|---|---|
| 5,918,279 | A | 6/1999 | Hecht et al. |
| 6,101,869 | A | 8/2000 | Kadohiro et al. |
| 6,227,159 | B1 | 5/2001 | Ropertz |
| 6,899,081 | B2 | 5/2005 | Bielicki et al. |
| 8,241,413 | B2 * | 8/2012 | Dirnberger ........... F02M 35/024 55/385.3 |
| 2010/0154369 | A1 | 6/2010 | Berisha et al. |
| 2011/0219768 | A1 | 9/2011 | Namimatsu et al. |
| 2015/0152818 | A1 * | 6/2015 | Fischer ................. B60R 21/34 55/385.3 |

FOREIGN PATENT DOCUMENTS

| | | |
|---|---|---|
| DE | 10343892 A1 | 4/2004 |
| DE | 102004002293 A1 | 7/2005 |
| DE | 202006004927 U1 | 8/2007 |
| DE | 202008010058 U1 | 12/2009 |
| DE | 102009048684 A1 | 4/2011 |
| DE | 102010045985 A1 | 2/2012 |
| DE | 102011015018 A1 | 9/2012 |
| EP | 1591653 A1 | 11/2005 |
| EP | 2152385 A1 | 2/2010 |
| GB | 2162087 A | 1/1986 |
| JP | 2001289132 A | 10/2001 |
| JP | 2012-202364 A | 10/2012 |
| JP | 2012-207540 A | 10/2012 |
| WO | WO-2013/035602 A1 | 3/2013 |

OTHER PUBLICATIONS

English abstract for JP-2012-207540.
English abstract for JP-2001289132.
English abstract for EP-1591653.
English abstract for DE-102011015018.
English abstract for DE-102010045985.
English abstract for JP-102009048684.
English abstract for DE-102004002293.
English abstract for DE-10230430.

* cited by examiner

AIR FILTER

CROSS-REFERENCE TO RELATED APPLICATIONS

This application claims priority to German Patent Application No. 10 2013 218 217.1, filed Aug. 11, 2013, and International Patent Application No. PCT/EP2014/069095, filed Sep. 8, 2014, both of which are hereby incorporated by reference in their entirety.

TECHNICAL FIELD

The invention relates to an air filter. It further relates to a filter module for an internal combustion engine, in particular the combustion motor of a motor vehicle.

BACKGROUND

In measurement- and control technology, so-called mass air flow meters (LMM, MAF) or mass air flow sensors (LMS) are used for determining the mass flow of air. An important area of use of such sensors lies in the field of the control of combustion processes, in particular in internal combustion engines, which depend significantly on the molar quantity of supplied atmospheric oxygen. Generic mass air flow meters therefore frequently come into use particularly in automobile, gas turbine and calorific value technology.

In engine management, such measuring sensors are used in particular in order to adjust—for example in the case of modern Otto or diesel engines—the amount of fuel to be injected into the intake tract or combustion chamber of the engine to the volume flow of the supplied fresh air. From the point of view of measurement accuracy, the stabilizing of the drawn-in air proves here especially to be a critical requirement for the subsequent measuring section. For this reason, the prior art comprises for example so-called Karman vortex mass air flow meters, which aim for a uniform flow speed by means of a honeycomb grid arranged at the inlet thereof.

A chronologically particularly high-resolution measurement, on the other hand, can be produced according to the prior art by way of thermal anemometry by means of so-called hot film mass air flow meters (HFM), which in vehicle internal combustion engines are usually arranged behind a possible air filter in the intake manifold. The invention is therefore based on the problem of providing an air filter which within the intake tract of an internal combustion engine is able to contribute to the stabilizing of the measurement signal of a downstream mass air flow meter. In addition, the invention sets the problem of providing an internal combustion engine which has been improved in a corresponding manner, in particular in the form of a combustion motor for a motor vehicle.

SUMMARY

These problems are solved by an air filter and a filter module for an internal combustion engine having the features of the claims.

The invention is therefore based on the fundamental idea of supplementing on the air filter the clean-air port, serving as a connection to a clean-air channel—arranged downstream of the air filter—, with a suitable air-flow grid, which gives the cleaned air emerging from the air filter a uniform flow field. The air flow which is homogenized in such a way can enter into the clean-air channel with reduced turbulences and can be supplied to an mass air flow meter arranged therein, which in this way is able to be determine with increased accuracy the mass of the air flowing through the clean-air channel per unit of time.

In an embodiment which is particularly advantageous for motor vehicle technology, the air filter is embodied here in the form of a so-called horseshoe filter of low overall height, which satisfies the extremely cramped available space in the engine compartment of modern motor vehicles due to the multiplicity of units. In addition, the use of the said horseshoe shape meets the stipulations of pedestrian protection, by permitting the maintaining of a sufficient minimum distance between the engine bonnet and the highest point of the air filter housing of a correspondingly equipped vehicle—despite the placing of the engine control unit on the air filter housing, which is structurally generally necessary. Finally, such a type of construction gives the engine compartment positive acoustic characteristics.

In a preferred configuration, the clean-air channel and the air filter according to the invention form the main components of an integrated filter module, which can find itself used again as an assembly of a generic motor vehicle. In this combination, a curved shaping of the clean-air channel is to be recommended, which may be supported in an identical manner by a corresponding curve of flow guide ribs running optionally along the channel. The curved path of the clean-air flow which is thus realized permits, in turn, the fluidic division of the channel into regions on the inside of the curve and on the outside of the curve, having different flow speed. The mentioned flow guide ribs, in so far as these project through the channel in its full height, assist this separation. The said first air-flow grid can be arranged here immediately upstream of a particular channel region and can be supported by an additional grid.

The said clean-air channel can hold here at the same time a mass airflow meter arranged downstream of the described assembly, wherein the thermal operating principle of a hot-wire anemometer or hot film mass air flow meter holds numerous advantages here. In this respect, the chronologically high resolution measurement signal of such a sensor, by means of its specific characteristics including further features of the downstream internal combustion engine, permits conclusions to be drawn not only regarding the mass flow of the intake air, but likewise its temperature and humidity. In the application scenario of a reciprocating piston engine, these measured variables permit a precise determining of the molar atmospheric oxygen mass available per cylinder filling, in order to determine the load-dependent optimum amount of the fuel to be injected or admixed.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained in further detail in the following description, wherein the same reference numbers refer to identical or similar or functionally identical components.

BRIEF DESCRIPTION OF THE DRAWINGS

There are shown, respectively diagrammatically

DETAILED DESCRIPTION

Figure 1:
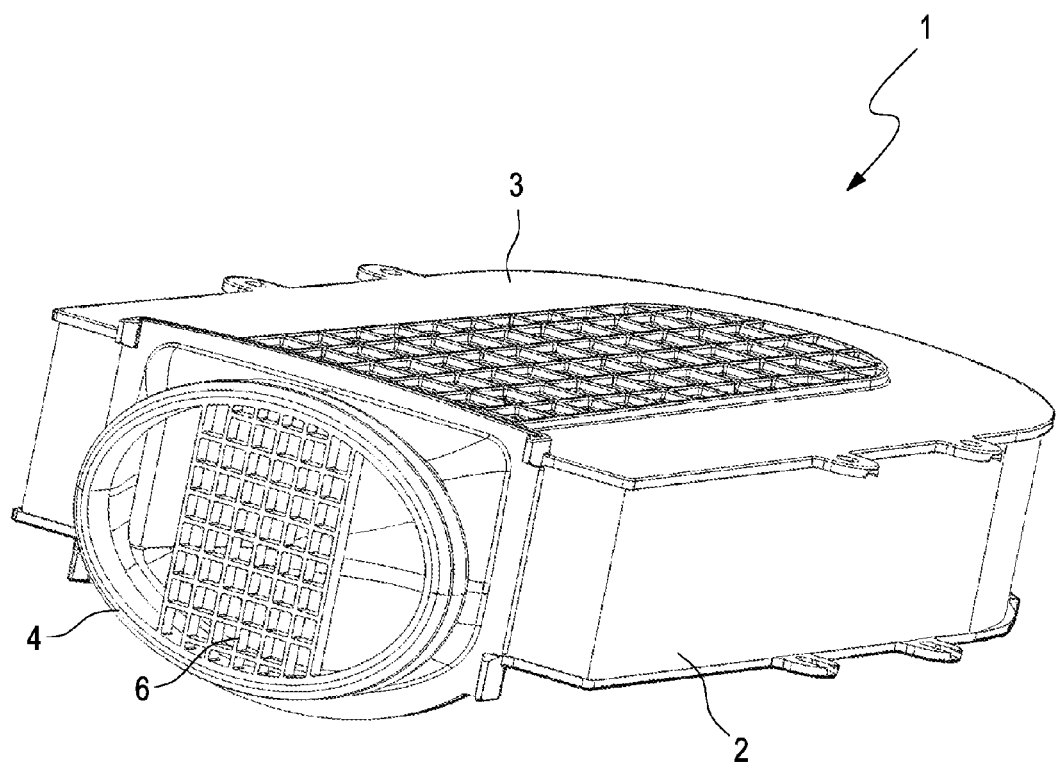
FIG. 1 the perspective view of an air filter according to the invention.

The detailed illustration according to FIG. 1 illustrates the basic structure of an air filter 1. In this context, basically any separator which is able to remove aerosols or other undesired suspended particles such as pathogens, pollen, dusts or gases from the air is regarded as an air filter.

In its present embodiment, the air filter 1 serves for cleaning the intake air of the Otto or diesel engine of a motor vehicle of dust, soot and tyre wear entrained in the air stream, in order to prevent premature wear on valves, cylinder running surfaces, piston rings, slide bearings and other machine parts, and disturbances to the injection of the engine. The structural stability of the air filter 1 is ensured here by means of two end plates 3, which are provided with reinforcement grids. Depending on their expected surface load, further support bodies of metal or plastic, not able to be seen in FIG. 1, can be arranged between the two end plates 3.

The air-permeable filter body 2 on the basis of a folded filter medium is situated as core component of the air filter 1 between the end plates 3 which are arranged substantially in a surface-parallel manner. The filter medium can be formed from a material web, similar to paper, with cellulose components or from a synthetic non-woven fibre fabric, as is commonly designated in specialist circles as a dry filter. A join connection between body 2 and housing 3 was produced for this for example by way of welding, plasticizing-in, vulcanizing or bonding. The horseshoe shape of the filter body 2, indicated in FIG. 1, permits here an entry of non-cleaned external air substantially via the entire edge surface of the air filter 1 encircling the filter body 2 perpendicularly to the housing covers.

Finally, on a face side of the air filter 1, facing the observer according to the viewing angle of FIG. 1, facing away from the U-shaped or horseshoe-shaped curvature of filter body 2 and filter housing 3, the clean-air port 4 is arranged, held in a form- and force-fitting manner by the filter housing 3, opening in to a passage surface, said clean-air port being in the form of a short attachment pipe piece, the configuration of which may be regarded as essential to the invention. The passage surface can be embodied in a circular shape or, as illustrated, in an oval shape. In this respect, a first air-flow grid 6 extends diametrically between two inner surfaces of the elliptical clean-air port 4 without, however, covering its entire passage surface.

In contrast to the flow cross-section defined by the narrowest point of the clean-air port 4, the first air-flow grid 6 has here substantially the shape of an elongated rectangle, which nevertheless nestles along its shorter edges up against the convex course of the clean-air port 4. With regard to the individual meshes of the first air-flow grid 6, an approximately square shape was selected here, which does not rule out the use of alternative geometries within the scope of the invention—for example, a honeycomb-shaped structure of the meshes of the air-flow grid 6 would come into consideration.

Figure 2:
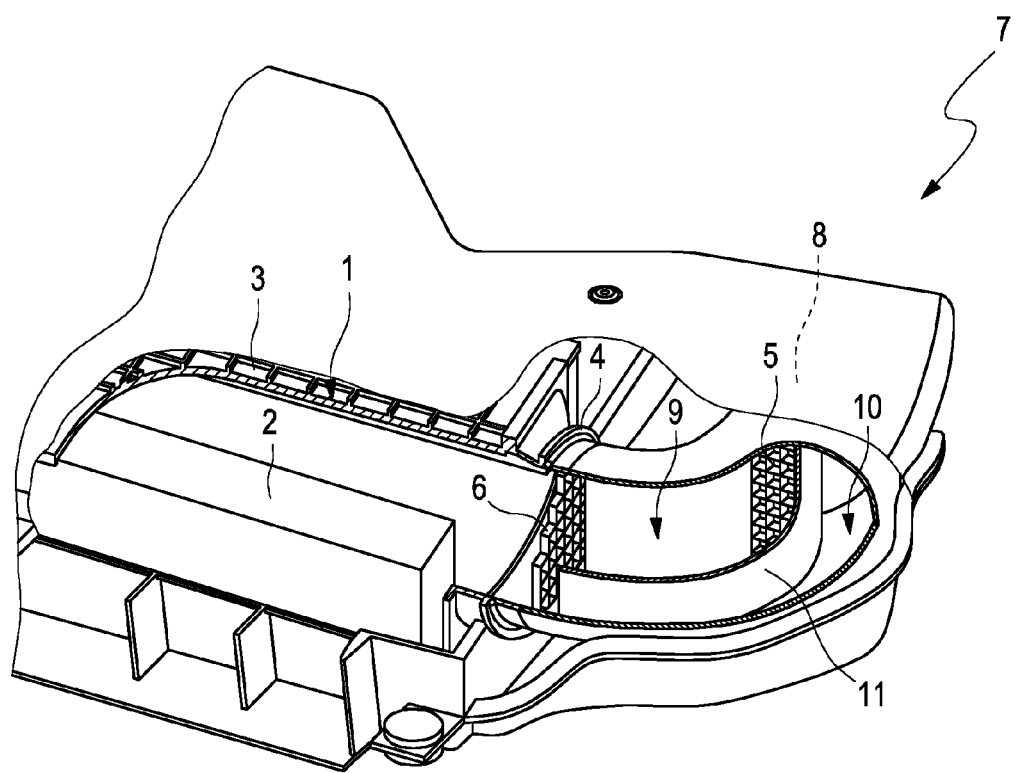
FIG. 2 the partial view of a filter module comprising the air filter of FIG. 1.

The operating principle of the air filter 1 in the context of a superordinate filter module 7 is illustrated by FIG. 2, which uses a partial sectional illustration for reasons of clarity.

However, the filter body 2, clean-air port 4 and parts of the first air-flow grid 6 of the air filter remain visible, which air filter, on the part of its filter body 2, is now connected fluidically with an intake opening of the filter module 7 which is not designated further in FIG. 2.

The uniformly curved shaping of the clean-air channel 9, 10, 11 deserves particular attention, which supplies the air, filtered by the air filter 1, to the combustion chamber of an internal combustion engine, not illustrated in FIG. 2, situated downstream. A flow guide rib 11, running along the channel 9, 10, 11, divides its flow cross-section here into an inner region 9 (on the inside of the curve) and an outer region 10. Although the diagrammatically simplified illustration of FIG. 2 does not reflect this geometry, the flow guide rib 11 passes through the clean-air channel 9, 10, 11 for this purpose in its entire height, wherein the first air-flow grid 6 is arranged immediately upstream of the inner region 9 and is supported by a second air-flow grid 5 fastened on the end side in the inner region 9. The outer region 10 of the clean-air channel 9, 10, 11 is kept free of air-flow grids and therefore only offers a small resistance to the air, so that the air pressure in the course of this outer region 10 only drops insignificantly.

In FIG. 2 it can be seen in addition that the first air-flow grid 6 extends in cross-section over the entire inner region 9. In the example which is shown, the first air-flow grid 6 projects over the inner region 9 in cross-section and extends over the flow guide rib 11 into the outer region 10. Hereby, the occurrence of irregularities, in particular of turbulences, in the flow in the marginal regions of the inner region 9 is counteracted. The stabilizing of the cleaned air by the first air-flow grid 6 is therefore improved. Here, the outer region 10 extends in cross-section only in certain areas over the outer region 10. Thereby, an improvement to the stabilizing of the air is also achieved.

The housing of the filter module has two housing parts which are connected with one another and form the external geometry at least in the region of the clean-air channel. The connection of the housing parts can be embodied detachably or non-detachably. In particular, the housing parts can be welded, screwed or clipped. A possible additional housing cover (not illustrated) can close a mounting opening for the filter element in an openable manner, when the housing parts are connected non-detachably with one another. The flow guide rib 11 can be formed onto one of the housing parts and can rest on the opposite housing part. Alternatively, each of the housing parts can have a portion of the flow guide rib. The flow guide rib parts then form jointly the flow guide rib. Here, no air-tight embodiment of the flow guide rib is necessary. Flow guide ribs with a minimal leakage are also conceivable.

On the other side of the second air-flow grid 5 in the inner region 9 a mass air flow meter 8 is situated which—according to the operating principle of a thermal anemometer—comprises an electrically heated sensor element, the electrical resistance of which depends definitively on its ambient temperature. By the circulating flow around this sensor element, a heat transmission takes place to the filtered air emerging from the clean-air channel 9, 10, 11, the amount of which alters with the speed of flow. Through a continuous resistance measurement of the sensor element of the mass air flow meter 8, a conclusion can thus be drawn as to the flow speed of the air directed out from the filter module 7 in the direction of the internal combustion engine. The sensor element is constructed here in the form of a film, so that the mass air flow meter 8 is to be assigned the type of construction of the so-called hot film mass air flow meter.

The invention claimed is:

1. An air filter for an internal combustion engine, comprising:
    an air-permeable filter body for cleaning air,
    a filter housing for holding the filter body,
    a clean-air port fluidically connected to the filter body and mechanically connected to the filter housing for attaching the air filter to a clean-air channel, and
    a first air-flow grid arranged in the clean-air port to stabilize the filtered air,
    wherein the filter body is horseshoe-shaped.

2. The air filter according to claim 1, wherein the first air-flow grid at least partially covers a passage surface of the clean-air port.

3. The air filter according to claim 2, wherein the passage surface is an oval end face of the clean-air port, and the first air-flow grid covers a central, substantially rectangular partial surface of the end face.

4. A filter module for an internal combustion engine, comprising:
    an intake opening for the intake of air,
    at least one air filter fluidically connected with the intake opening for the filtering of the air, the at least one air filter including:
    an air-permeable filter body for cleaning the air,
    a filter housing for holding the filter body,
    a clean-air port fluidically connected to the filter body and mechanically connected to the filter housing for attaching the air filter to a clean-air channel, and
    a first air-flow grid arranged in the clean-air port to stabilize the filtered air,
    a clean-air channel connected fluidically with the at least one air filter for introducing the filtered air into a combustion chamber of the internal combustion engine, the clear-air channel having an inner region, and an outer region, and
    at least one flow guide rib running along the clean-air channel between the inner region and the outer region for separating the regions.

5. The filter module according to claim 4, further comprising a mass air flow meter arranged in the clean-air channel for measuring a mass flow of the filtered air.

6. The filter module according to claim 5, wherein the mass air flow meter is downstream of the inner region, the outer region, and the at least one flow guide rib.

7. The filter module according to claim 6, wherein the at least one flow guide rib projects through the clean-air channel diametrically in cross-section.

8. The filter module according to claim 6, wherein the first air-flow grid is arranged immediately upstream of the inner region.

9. The filter module according to claim 6, further comprising a second air-flow grid arranged within the inner region immediately upstream of the mass air flow meter.

10. The filter module according to claim 6, wherein the first air-flow grid extends in cross-section over the entire inner region.

11. The filter module according to claim 6, wherein the first air-flow grid projects over the inner region in cross-section.

12. The filter module according to claim 6, wherein the first air-flow grid extends in cross-section at least partially over the outer region.

13. The air filter according to claim 4, wherein the filter body is cylindrical, plate-shaped, or horseshoe-shaped.

14. The filter module according to claim 4, wherein the first air-flow grid at least partially covers a passage surface of the clean-air port.

15. The air filter according to claim 14, wherein the passage surface is an oval end face of the clean-air port, and the first air-flow grid covers a central, substantially rectangular partial surface of the end face.

16. The air filter according to claim 4, wherein the filter body is cylindrical, plate-shaped, or horseshoe-shaped.

17. The air filter according to claim 4, wherein the clean-air channel is curved.

18. The filter module according to claim 5, characterized by wherein the mass air flow meter is a hot film mass air flow meter.

19. A filter module for an internal combustion engine, comprising:
    an intake opening for the intake of air,
    at least one air filter fluidically connected with the intake opening for the filtering of the air, the at least one air filter including:
    an air-permeable filter body for cleaning the air,
    a filter housing for holding the filter body,
    a clean-air port fluidically connected to the filter body and mechanically connected to the filter housing for attaching the air filter to a clean-air channel, and
    a first air-flow grid arranged in the clean-air port to stabilize the cleaned air,
    a clean-air channel connected fluidically with the air filter for introducing the filtered air into a combustion chamber of the internal combustion engine, and
    a mass air flow meter arranged in the clean-air channel for measuring a mass flow of the filtered air,
    wherein the clean-air channel has, upstream of the mass air flow meter, an inner region, an outer region, and at least one flow guide rib running along the clean-air channel between the inner region and the outer region for separating the regions;
    wherein the first air-flow grid is at an end of the clean-air channel only at an end of the inner region.

* * * * *